United States Patent
Feinleib et al.

(10) Patent No.: US 6,775,828 B2
(45) Date of Patent: *Aug. 10, 2004

(54) DELAYED UPLOADING OF USER REGISTRATION DATA

(75) Inventors: David Feinleib, Kirkland, WA (US); Carl L. Gulledge, Redmond, WA (US); Brian K. Moran, Issaquah, WA (US); Kenneth D. Moss, Redmond, WA (US); Autumn F. G. Neault, Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,063

(22) Filed: Jul. 19, 1999

(65) Prior Publication Data

US 2003/0172124 A1 Sep. 11, 2003

(51) Int. Cl.[7] .................................................. G06F 15/16
(52) U.S. Cl. ........................ 717/173; 709/227; 709/229
(58) Field of Search ................................ 717/174, 173, 717/175, 176, 177, 178, 171–172; 710/36; 709/221, 224, 227, 229; 713/1, 201

(56) References Cited

U.S. PATENT DOCUMENTS

| | | | |
|---|---|---|---|
| 5,761,662 A | | 6/1998 | Dasan |
| 5,790,664 A | | 8/1998 | Coley et al. |
| 5,790,785 A | | 8/1998 | Klug et al. |
| 5,892,909 A | | 4/1999 | Grasso et al. |
| 5,933,811 A | * | 8/1999 | Angles et al. ................. 705/14 |
| 5,974,454 A | * | 10/1999 | Apfel et al. ................. 709/221 |
| 6,009,274 A | * | 12/1999 | Fletcher et al. ............. 717/173 |
| 6,035,423 A | * | 3/2000 | Hodges et al. ................. 714/38 |
| 6,047,313 A | * | 4/2000 | Hashimoto et al. ......... 709/203 |
| 6,067,582 A | * | 5/2000 | Smith et al. .................... 710/5 |
| 6,151,643 A | * | 11/2000 | Cheng et al. ................. 710/36 |
| 6,226,751 B1 | * | 5/2001 | Arrow et al. ............... 709/227 |
| 6,405,309 B1 | * | 6/2002 | Cheng et al. .................. 713/1 |
| 6,505,300 B2 | * | 1/2003 | Chan et al. ................. 709/229 |

FOREIGN PATENT DOCUMENTS

EP  0917119 A2  5/1999

* cited by examiner

Primary Examiner—Zarni Maung
(74) Attorney, Agent, or Firm—Lee & Hayes, PLLC

(57) ABSTRACT

A client computer collects registration information regarding a user and/or the client computer and attempts to upload the collected information to a remote registration system. The client computer stores the registration information locally and delays uploading of the information to the registration system until a connection to the registration system is established. The connection to the registration system and the uploading of the registration information can be performed automatically and transparently to the user, eliminating the need for any further required actions on the part of the user once the registration information is collected.

28 Claims, 4 Drawing Sheets

DELAYED UPLOADING OF USER REGISTRATION DATA

TECHNICAL FIELD

This invention relates to computer systems and collection of information regarding users. More particularly, the invention relates to delayed uploading of user registration data.

BACKGROUND OF THE INVENTION

Uses for computers in our daily lives are continually expanding. As these uses expand, it is beneficial for the manufacturers of both the computers and the software the computers ran to have information on the manner in which the computers and software are used, as well as information on the users of the computers and software. Having such information assists the manufacturers in designing and creating computers and software that are more useful and better aligned with users' needs and desires. Providing such information is also beneficial to consumers on a daily basis because the software/computer maker can personalize the user's computer/software experience by establishing an ongoing electronic relationship with the consumer.

One approach to obtaining such information is to collect "registration information" or "registration data" from the user and transmit it to the manufacturer. Registration information refers to demographic and other information regarding the user and the user's computer, such as information regarding the user's intended use of the computer or software, the user's preferred activities, hobbies, other computer hardware or software components or peripherals that are being used in conjunction with the computer or software, the user's electronic mail address and locale information (such as zip code), etc. The registration information may also include information regarding the computer itself (e.g., identification numbers, processor type, amount of memory, connected peripheral devices, etc.).

Registration information is typically collected via one or more "registration wizards", each of which is a program that is executed when the computer is initially set up by the user or the software is installed. The registration wizard asks the user various questions to elicit the registration information, and may also interrogate the computer itself to obtain information (e.g., processor type) regarding the computer. There is typically a different registration wizard for the computer, one or more of the software programs being run on the computer, and sometimes for additional peripheral devices coupled to the computer (e.g., printers or scanners).

Once the registration information is collected, the registration wizard transmits or "uploads" the collected information to a registration database, from which a manufacturer is able to subsequently retrieve the collected information. The registration database is typically accessed via a network (e.g., the Internet), or via a direct-connection (e.g., a direct phone call to a computer system maintaining the registration database).

However, a wide variety of problems can be encountered during this uploading process. For example, the computer's modem may not be working properly or may not be turned on, the modem may not be connected to a phone line yet, the phone line that needs to be used to make the call may be in use by someone else (or another computer) at the time, the phone number that is being called may be busy, there may be problems in the connection to the Internet that prevent establishing a connection to the registration database (e.g., Internet usage is too heavy), the registration database may not be operational (e.g., down for maintenance), etc.

Typically, when one of these problems is encountered, the registration wizard terminates. No further attempt is made to upload the registration information to the registration database unless the registration wizard is run again by the user, which is very unlikely. Thus, when one of these uploading problems occurs, the registration information is typically not provided to the registration database, resulting in the computer manufacturer or software maker never receiving the registration information and the user's experience suffering as a result.

The invention described below addresses these disadvantages of the prior art, providing a way to upload user registration data despite problems encountered during the uploading process.

SUMMARY OF THE INVENTION

A client computer is configured to collect registration information regarding a user and/or the client computer and upload the collected information to a remote registration system. The client computer stores the registration information locally for as long as necessary until a connection to the remote registration system is established. When a connection to the remote registration system is established, the registration information is uploaded to the registration system automatically, without additional user action. The uploading of the registration information can be delayed as long as necessary, simply waiting for a connection to the registration system to be established.

According to one aspect of the invention, once the registration information is collected from the user an attempt is made to connect to the registration system. If the attempt is successful, then the registration information is uploaded at that time and delayed uploading is not necessary. However, if the attempt is unsuccessful, then the client computer stores the registration information locally and delays uploading of the registration information until a connection to the registration system is established.

According to another aspect of the invention, the client computer stores the registration information locally as soon as it is collected—no attempt is made as part of the registration process to connect to the registration system. The client computer then waits for a connection to the registration system to be initiated by some other program. The client computer takes advantage of this connection to transmit the registration information to the registration system. Thus, uploading of the registration information is delayed until another (non-registration program) initiated connection to the registration system is made (for example a phone call to connect the user to the Internet).

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Architecture

Figure 1:
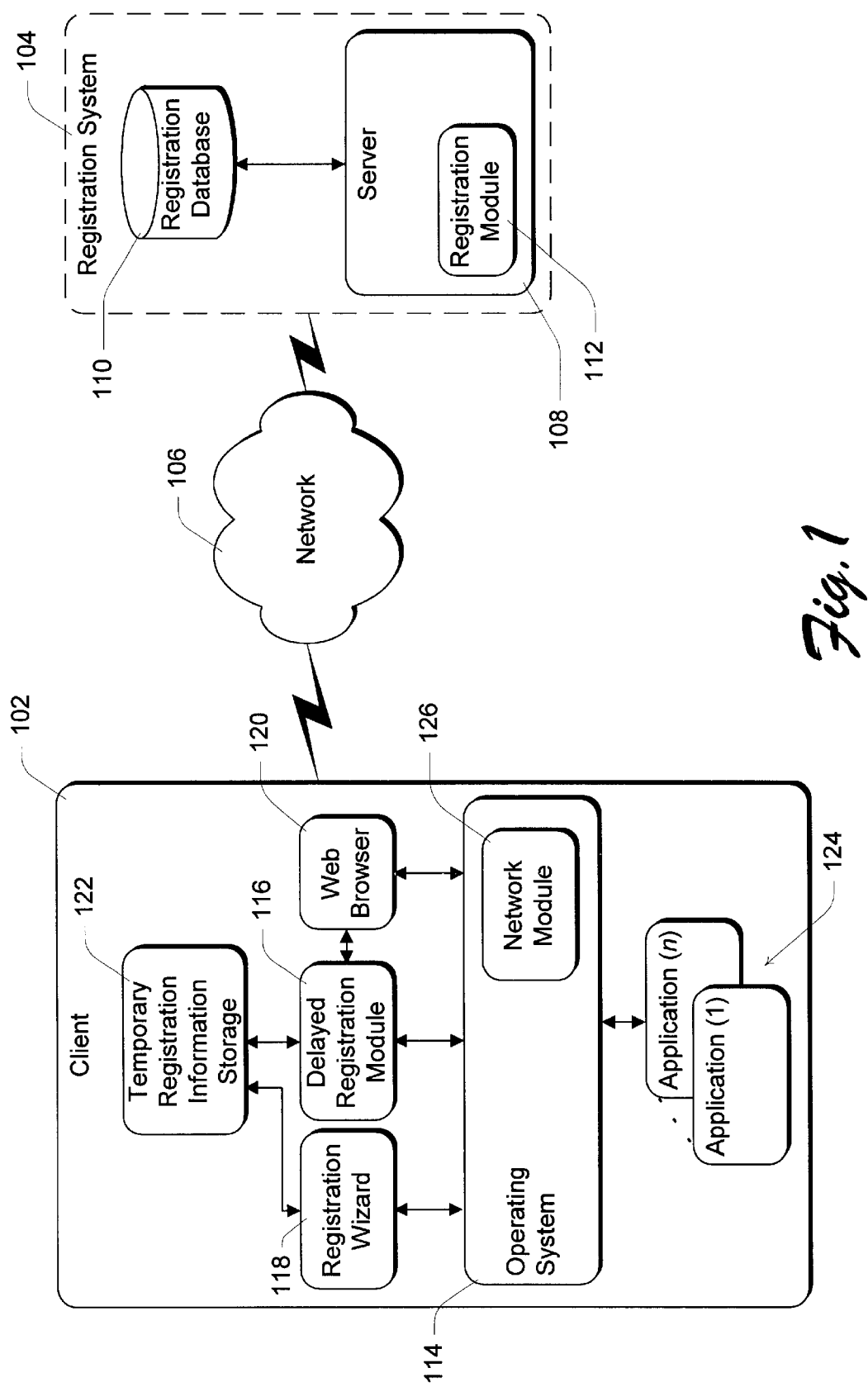
FIG. 1 illustrates an exemplary client computer 102 and registration system 104 in accordance with the invention.

FIG. 1 illustrates an exemplary client computer 102 and a remote registration system 104 in accordance with the invention. Registration data or information is collected at client computer 102 and subsequently transferred or "uploaded" to registration system 104, where the registration information can be accessed by the manufacturer. Client computer 102 and registration system 104 communicate with each other over a data communications network 106. In the illustrated example, data communications network 106 can include one or more of: the Internet, PSTN networks, local area networks (LANs), and private wide area networks (WANs). Communication between client 102 and registration system 104 can be via any of a variety of conventional communication protocols, such as the Hypertext Transfer Protocol (HTTP).

Registration system 104 includes a server computer 108 coupled to a registration database 110. Although illustrated separately, it is to be appreciated that registration database 110 may alternatively be part of server computer 108. A registration module 112 of server 108 communicates with client 102 to receive the registration information from client 102. Registration module 112 stores the received registration information in registration database 110 for subsequent access by the manufacturer. Server 108 may have additional conventional "web server" functionality, or alternatively may be a dedicated server used for receiving registration information only.

Client computer 102 includes an operating system 114, delayed registration module 116, registration wizard 118, web browser 120, temporary registration information storage 122, and multiple (n) additional applications 124, coupled together as illustrated. Operating system 114 represents any of a wide variety of conventional operating systems, such as the "Windows" brand of operating systems, available from Microsoft Corporation of Redmond, Wash. Delayed registration module 116, registration wizard 118, and web browser 120 are illustrated as applications or modules separate from operating system 114. Alternatively, one or more of module 116, wizard 118, and browser 120 may be incorporated into operating system 114. Additional software applications 124 may also be running on client 102. Examples of such applications include games, word processors, spreadsheets, etc.

Web browser 120 provides a user interface allowing a user to access servers coupled to network 106 via a variety of different communications protocols, such as HTTP. An example of such a web browser is "Internet Explorer", available from Microsoft Corporation.

Operating system 114 includes a network module 126 that controls the client computer's 102 access to network 106. Network module 126 can establish, at the request of an application running on client computer 102, a connection to network 106. Once established, network module 126 manages the connection according to any of a wide variety of conventional communications protocols. Such a connection can be established in any of a variety of conventional manners, such as a dial-up connection using a conventional modem and telephone line, connection through a network proxy, etc.

Registration wizard 118 collects registration information, including demographic and other user- or client computer-related information from a user of client 102. This collection occurs, for example, when the client computer is first set up or the software is first installed. Registration wizard 118 collects this registration information by prompting the user for inputs. This prompting can be done in any of a variety of conventional manners, such as through menu options, radio buttons, or other data-entry fields of a graphical user interface, through audio questions and user-responses via a microphone, etc. Registration wizard 118 may also interrogate, either with or without the user's knowledge, the operating system 114 or other modules to ascertain additional computer-related information (e.g., processor type, amount of memory, etc.). Although a single registration wizard 118 is shown in FIG. 1, it is to be appreciated that multiple registration wizards may be run on client 102. Typically, both the manufacturer of client computer 102 and the manufacturer of operating system 114 include their own registration wizards. Furthermore, additional applications 124 or other peripheral devices (e.g., printers, scanners, etc.) may also include their own registration wizards.

According to one implementation of the invention, once all of the registration information is collected, registration wizard 118 stores the registration information locally in temporary registration information storage 122. Temporary registration information storage 122 is a nonvolatile storage device (e.g., a magnetic or optical disk, flash memory, etc.) that maintains the registration information in client computer 102 (or alternatively a peripheral component coupled to client computer 102) until the information can be uploaded to registration system 104. Delayed registration module 116 then, at a subsequent time, uploads the registration information from temporary registration information storage 122 to registration system 104.

According to another implementation of the invention, once all of the registration information is collected, registration wizard 118 attempts to upload the registration information to registration system 104. If the transfer attempt is successful, then the registration process terminates. However, if the transfer attempt is unsuccessful, then the registration information is stored in temporary registration information storage 122. Delayed registration module 116 then, at a subsequent time, uploads the registration information from temporary registration information storage 122 to registration system 104.

In the illustrated example, when delayed registration module 116 is given the responsibility of uploading the registration information to registration system 104, module 116 waits to upload the registration information to registration system 104 until a connection to network 106 (or server 108) is detected. No re-execution or initiation of the registration wizard is needed. Delayed registration module 116 maintains a record of what registration information (if any) is being stored in registration information storage 122 that has not yet been uploaded. Such a connection need not be, and typically is not, initiated by registration wizard 118. Rather, module 116 simply waits until any application (e.g., applications 124 or browser 120) initiates a connection to network 106 and takes advantage of the connection. By using the connection in such a manner, the registration information can be uploaded to registration system 104 transparently to the user—the user need not be informed that a problem (if any) in transmitting the information occurred.

Delayed registration module 116 takes advantage of a connection to registration server 108 that is initiated by another program. Another program, such as web browser 120, may make a connection to server 108 due to, for example, a user request to access a web page stored at server 108. Alternatively, server 108 may be a default server that web browser 120 connects to each time it establishes a connection to network 106. Web browser 120 can communicate information to delayed registration module 116 informing module 116 of which web sites are being accessed. Alternatively, delayed registration module 116 may provide web browser 120 with a web site that, when accessed, causes web browser 120 to inform module 116 of such access.

According to one implementation, delayed registration module 116 detects when a connection to network 106 is made by monitoring client 102 for access to a particular web site hosted by server 108. The web site is identified by its Universal Resource Locator (URL), or alternatively the site's network address (e.g., its IP address). Delayed registration module 116 is notified by web browser 120 (or other component of client 102, such as network module 126) when a connection is made to the web site hosted by server 108. Server 108 can be a web server that is likely to be accessed by web browser 120, such as a server hosting a web site of one of the manufacturers (e.g., having an URL of www.microsoft.com) or another web site, such as a default location of web browser 120 that is accessed when web browser 120 is initiated. Once the connection to server 108 is established, delayed registration module 116 communicates, via a web post with registration module 112 to upload the registration information to registration system 104.

Alternatively, delayed registration module 116 can also take advantage of a connection to network 106, without regard for what server was accessed. Delayed registration module 116 can be informed by network module 126 whenever a connection to network 106 is established. In response, delayed registration module 116 can upload the registration information to server 108, or alternatively module 116 can send a message to web browser 120 informing browser 120 of the registration information that needs to be uploaded and the address of server 108. Web browser 120 can then open a connection via network 106 to server 108 rather than whatever site was requested by the user of browser 120 (or the program initiating the network connection). Upon completing uploading of the registration information to registration system 104, browser 120 can connect to whatever site was requested by the user (or program initiating the network connection). Given the latencies typically involved in accessing a server via a network such as the Internet, the registration information can often be uploaded without the user's knowledge that server 108, rather than the requested server, was temporarily accessed.

A function is added to network module 126 to call or send a message to delayed registration module 116 whenever a network connection (e.g., dial-up networking) is established. Network module 126 can issue a system-wide notification message when the connection is established, thereby informing any components in the system that are listening (e.g., delayed registration module 116) that the connection has been established. Alternatively, network module 126 can have one or more executable programs registered with it (e.g., delayed registration module 116) that are launched by network module 126 when a network connection is established.

Network connection module 126, upon making a connection to network 106, indicates to delayed registration module 116 that such a connection has been made. In response, delayed registration module 116 establishes a connection to registration system 104 in a conventional manner via the network. Once the connection to registration system 104 is established, the registration information is uploaded to registration system 104. Alternatively, delayed registration module 116 can initiate web browser 120 (if not already running) and provide browser 120 with the registration information to be uploaded and the address of server 108. Upon receiving this information browser 120, using the newly established connection, uploads the registration information to registration system 104.

Additionally, due to the configurations of the Internet and private intranets (typically used for internal corporate networks), situations can arise where the same web site name or server address is used for a site or server on the Internet as well as another site or server on an intranet. For example, a corporation may include the web site "www.microsoft.com" on its intranet, which is the same URL as the "www.microsoft.com" web site on the Internet. In order to ensure that such situations result in the registration information being uploaded to the proper site/server (typically, the site/server on the Internet rather than the intranet site/server), an additional security feature is used. This additional security feature may be a password or alternatively delayed registration module 116 may attempt to access a "hidden" portion of a web page on the server 108. The manufacturer (e.g., Microsoft Corporation), can embed special code or data in the web page on the Internet that would typically not be duplicated by an intranet version of that web page. Thus, if delayed registration module 116 successfully finds the embedded "hidden" code or data, delayed registration module 116 can verify that it is connected to the Internet version of the web site rather than an internal version.

In the illustrated embodiment, delayed registration module 116 attempts to upload the registration information whenever a connection to a network is made. Delayed registration module 116 may be informed that a network connection has been made without being informed of (or otherwise having knowledge of) whether the connection is to the Internet or to some other network. So, delayed registration module 116 attempts to post the registration information in response to the network connection being made. If the connection is to a network that allows the post to be made, then the registration information is uploaded and delayed registration module 116 no longer attempts to upload the information. However, if the connection is not to a network that allows the post to be made, then the uploading of the registration information will fail (e.g., the web server will not be found, the web page may not have the proper "hidden" portion, etc.). Delayed registration module 116 will then continue to attempt to upload the registration information each time a network connection is detected, continuing the process until the uploading is successful.

Alternatively, different methodologies may be used to determine when client 102 is connected to network 106. According to one such alternate implementation, a connection to network 106 is detected by client 102 accessing server 108. When server 108 is accessed (e.g., a web site hosted by server 108 is connected to) by client 102 (e.g., browser 120), whether for registration or other purposes, registration module 112 sends a request for registration information to client 102. Upon receipt of such a request, delayed registration module 116 determines whether any registration information is being maintained in registration information storage 122. If any such registration information is being maintained, then delayed registration module 116 forwards the registration information to web browser 120 (or other program) for uploading to server 108.

Regardless of the manner in which detection of a connection to network 106 is made, delayed registration module 116 may also use various security-checking techniques to verify that registration system 104 is being communicated with. Such techniques include use of a password where registration module 112 must provide a correct password in order to receive the registration information. By way of another example, a challenge/response technique may be employed, in which delayed registration module 116 must provide a proper "challenge" to registration module 112, in response to which registration module 112 must provide a proper response.

Exemplary Computer System

In the discussion herein, the invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention could be implemented in hardware or a combination of hardware, software, and/or firmware. For example, one or more application specific integrated circuits (ASICs) could be programmed to carry out the invention.

Figure 2:
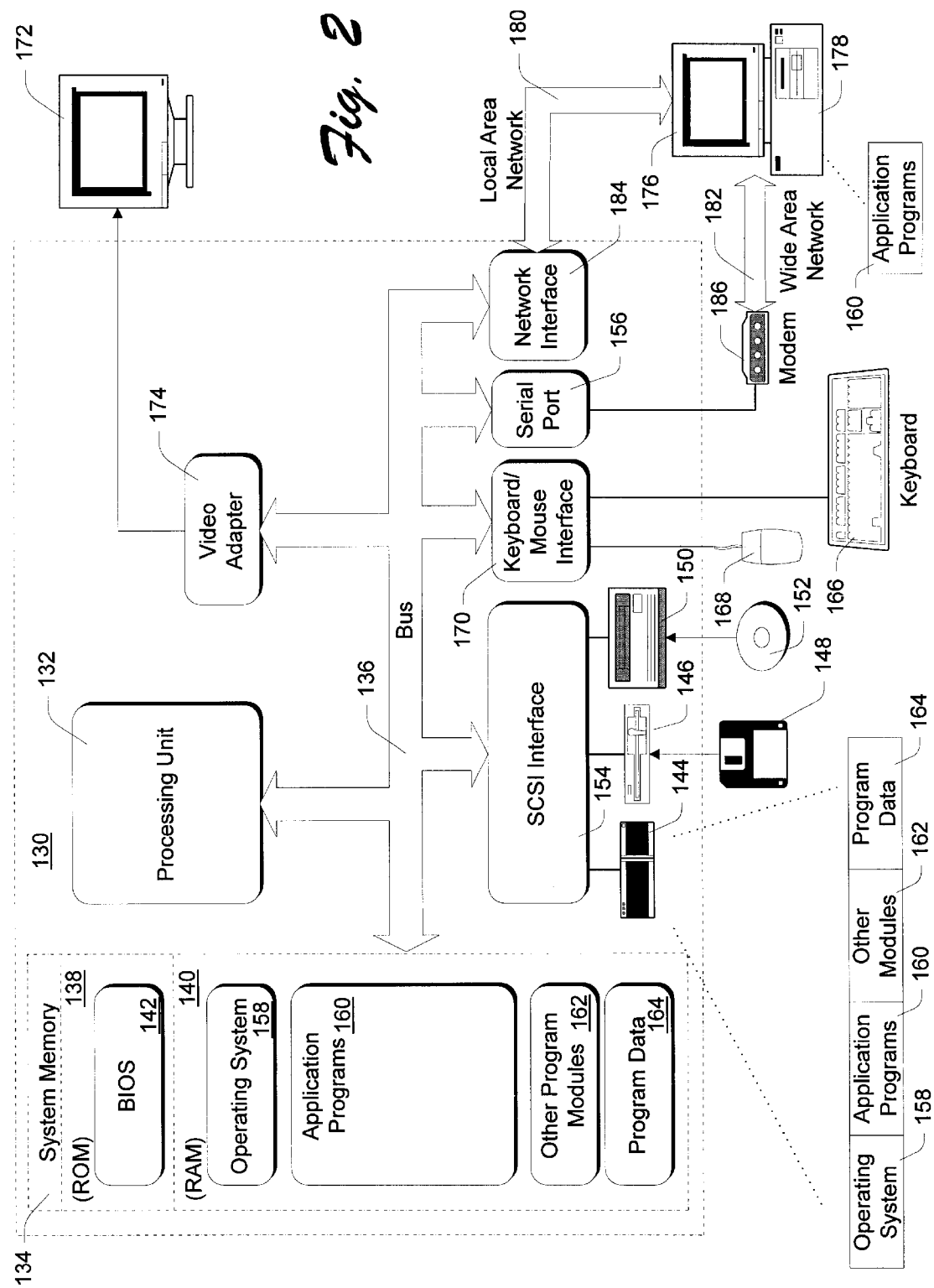
FIG. 2 shows a general example of a computer 130 that can be used as a server or client in accordance with the invention.

FIG. 2 shows a general example of a computer 130 that can be used as a server or client in accordance with the invention. Computer 130 is shown as an example of a computer that can perform the functions of a client computer 102 or a registration system 104 of FIG. 1.

Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136, by an SCSI interface 154 or some other appropriate interface. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Washington.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Operation

Figure 3:
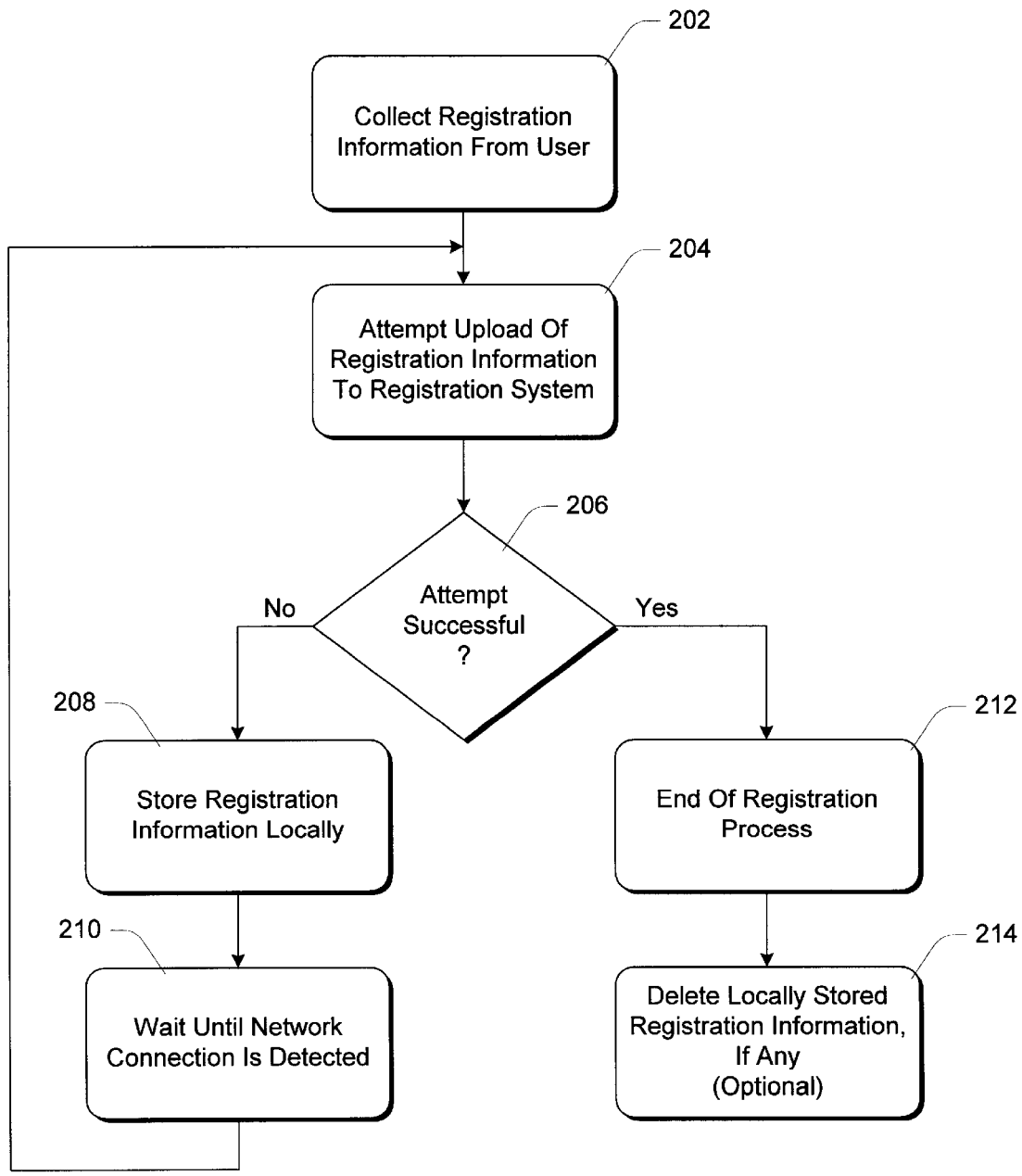
FIG. 3 is a flowchart illustrating exemplary steps of delayed registration information uploading in accordance with one implementation of the invention.

FIG. 3 is a flowchart illustrating exemplary steps of delayed uploading of registration information in accordance with one implementation of the invention. The steps of FIG. 3 are implemented by client computer 102 of FIG. 1, and may be performed in software. FIG. 3 is described with additional reference to components in FIG. 1.

Registration information is initially collected from the user by registration wizard 118 of client computer 102 (step 202). The registration wizard 118 then attempts to upload the registration information to remote registration system 104 (step 204). If the attempt is not successful (step 206), then registration wizard 118 stores the registration information locally in temporary storage 122 (step 208). Client computer 102 then waits until a connection to the network 106 is detected (step 210), and again attempts to upload the registration information (step 204).

However, if the attempted uploading of the registration information to registration system 104 is successful (step 206), then the registration process ends (step 212). Any registration information stored in temporary registration information storage 122 of client computer 102 may optionally be deleted (step 214).

Figure 4:
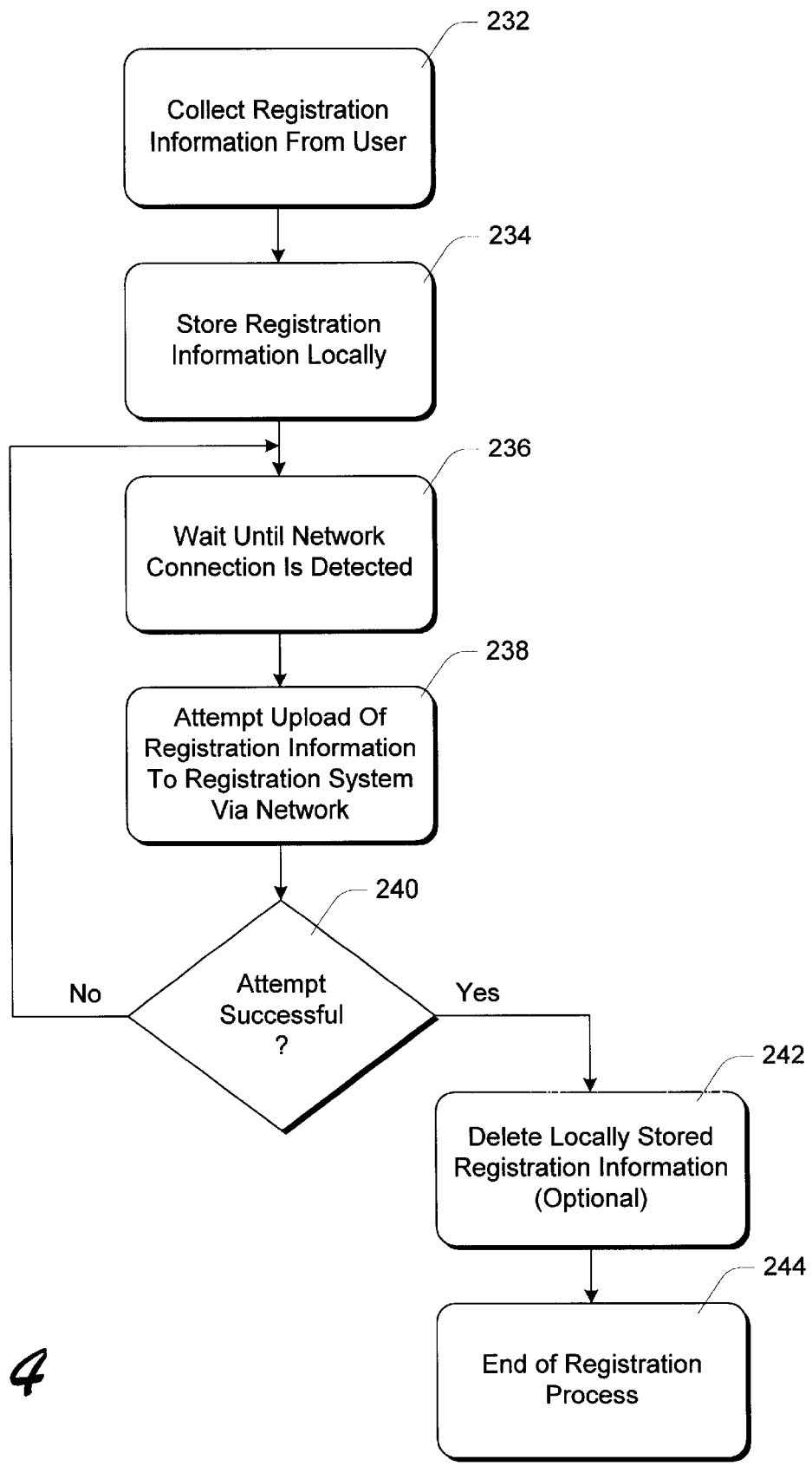
FIG. 4 is a flowchart illustrating exemplary steps of delayed registration information uploading in accordance with another implementation of the invention.

FIG. 4 is a flowchart illustrating exemplary steps of delayed uploading of registration information in accordance with another implementation of the invention. The steps of FIG. 4 are implemented by client computer 102 of FIG. 1, and may be performed in software. FIG. 4 is described with additional reference to components in FIG. 1.

Registration information is initially collected from the user by registration wizard 118 (step 232) and stored locally in temporary registration information storage 122 (step 234). Client computer 102 then waits until a network connection is detected (step 236). When the connection is detected, delayed registration module 116 attempts to upload the registration information to registration system 104 (step 238).

If the attempted uploading is not successful (step 240), then client computer 102 returns to step 236 to wait until a network connection is again detected. However, if the uploading is successful, then the registration information that was uploaded is optionally deleted from temporary registration information storage 122 (step 242), and the registration process ends (step 244).

CONCLUSION

The invention provides for delayed uploading of user registration information. Registration information is collected from the user and/or the user's computer via a registration wizard and can be stored locally until a connection to a remote registration system can be established. When such a connection is established, the invention advantageously detects the connection and uploads any locally stored registration information at that time. This detection and uploading can be done transparently to the user, thereby eliminating any need for the user to re-run the registration wizard, or know when the registration information is uploaded.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable media having stored thereon a computer program that, when executed by one or more processors, causes the one or more processors to perform functions including:

collecting registration information using a registration wizard;

storing the registration information locally;

detecting when a connection is established to a network that a registration system is coupled to, the connection being initiated by a program other than the registration wizard; and uploading the registration information to the registration system when the connection is detected.

2. One or more computer-readable media as recited in claim 1, wherein the detecting comprises detecting when a connection to the Internet is established.

3. One or more computer readable media as recited in claim 1, wherein the detecting comprises receiving a request for the registration information from the registration system.

4. One or more computer-readable media as recited in claim 1, wherein the detecting comprises:

detecting that the connection to the network is established when a web browser accesses a predetermined web site on the network.

5. One or more computer-readable media as recited in claim 4, wherein the detecting further comprises:

checking whether predetermined data exists at a location of the web site; and determining that the connection to the network is established if the predetermined data the exists at the location of the web site, otherwise determining that the connection to the network is not established.

6. One or more computer-readable media as recited in claim 4, further comprising:

receiving a password from the registration system;

checking whether the password is valid; and uploading the registration information to the registration system only if the password is valid.

7. One or more computer-readable media as recited in claim 4, wherein the detecting distinguishes between a web site on an intranet and a web site on the Internet, and wherein the web site on the intranet and the web site on the Internet have the same name.

8. One or more computer-readable media as recited in claim 1, wherein the detecting comprises identifying when a connection to a web site not hosted by the registration system is requested, and wherein the uploading comprises:

accessing the registration system;

transferring the registration information to the registration system; and then accessing the requested web site.

9. A method comprising:

executing a registration wizard, the registration wizard, collecting registration information, and storing the registration information locally;

letting the registration wizard terminate execution; and uploading the registration information to a remote registration system, after execution of the registration wizard terminates, without requiring re-execution of the registration wizard.

10. A method as recited in claim 9, wherein the uploading comprises transferring the registration information to the remote registration system via the Internet.

11. A method as recited in claim 9, further comprising:

detecting when a connection to a network is made, wherein the remote registration system is coupled to the network; and uploading the registration information to the remote registration system when the connection to the network is detected.

12. A method as recited in claim 11, wherein the detecting comprises detecting that the connection to the network is made when a browser accesses a predetermined web site on the network.

13. A method as recited in claim 11, wherein the detecting comprises identifying when a connection to a web site that is on the network and is not hosted by the registration system is requested.

14. A method as recited in claim 13, wherein the uploading comprises:

accessing the registration system;

transferring the registration information to the registration system; and then accessing the requested web site.

15. A method as recited in claim 11, wherein the detecting comprises receiving a request, from the registration system, for the registration information.

16. One or more computer-readable memories containing a computer program that is executable by a processor to perform the method recited in claim 9.

17. A method as recited in claim 9, wherein the uploading comprises uploading the registration information in response to detecting that a connection to a network is made, and wherein the detecting distinguishes between a server address on an intranet and a server address on the Internet.

18. A method comprising:

collecting registration information;

attempting to transmit the registration information to a registration system;

if the transmission attempt is not successful, then, storing the registration information locally;

detecting when a connection is established to a network that the registration system is coupled to, the connection being initiated by a program other than a program that collected the registration information; and uploading the registration information to the registration system when the connection is detected.

19. A method as recited in claim 18, wherein the uploading comprises uploading the registration information to the registration system in the absence of a user request to transmit the registration information.

20. A method as recited in claim 18, wherein the uploading comprises uploading the registration information via the Internet.

21. One or more computer-readable memories containing a computer program that is executable by a processor to perform the method recited in claim 18.

22. An apparatus comprising:

a registration wizard to collect registration information;

a storage device to temporarily store the registration information; and a delayed registration module, coupled to the registration wizard and the storage device, to upload the registration information to a remote registration system via a network when a connection to the network is initiated by a module other than the registration wizard.

23. An apparatus as recited in claim 22, wherein the delayed registration module is further to detect the connection to the network by identifying when a request to access a web site on the network not hosted by the remote registration system is received.

24. An apparatus as recited in claim 23, wherein the delayed registration module is further to:

access the registration system in response to the request;

transfer the registration information to the registration system; and then access the requested web site.

25. An apparatus as recited in claim 22, wherein the delayed registration module is further to distinguish between a connection to a registration system on the Internet and a web site having a same name as the registration system on an intranet.

26. A system comprising:

a client computer to, collect using a registration wizard, registration information, store, for as long as necessary, the registration information until a connection to a network is established, and detect when a connection to the network is established, the connection being initiated by a program other than the registration wizard running on the client computer; and a registration system, coupled to the network, to, receive the registration information from the client computer, and store the registration information in a registration database.

27. A system as recited in claim 26, wherein the registration system includes a server to issue a request to the client for the registration information.

28. A system as recited in claim 26, wherein the client computer further distinguishes, in detecting when the connection to the network is established, between a web site on an intranet and a web site on the Internet, and wherein the web site on the intranet and the web site on the Internet have the same name.

* * * * *